Jan. 14, 1964 I. DORROS ETAL 3,118,134
MAGNETIC MEMORY CIRCUITS
Filed July 14, 1960
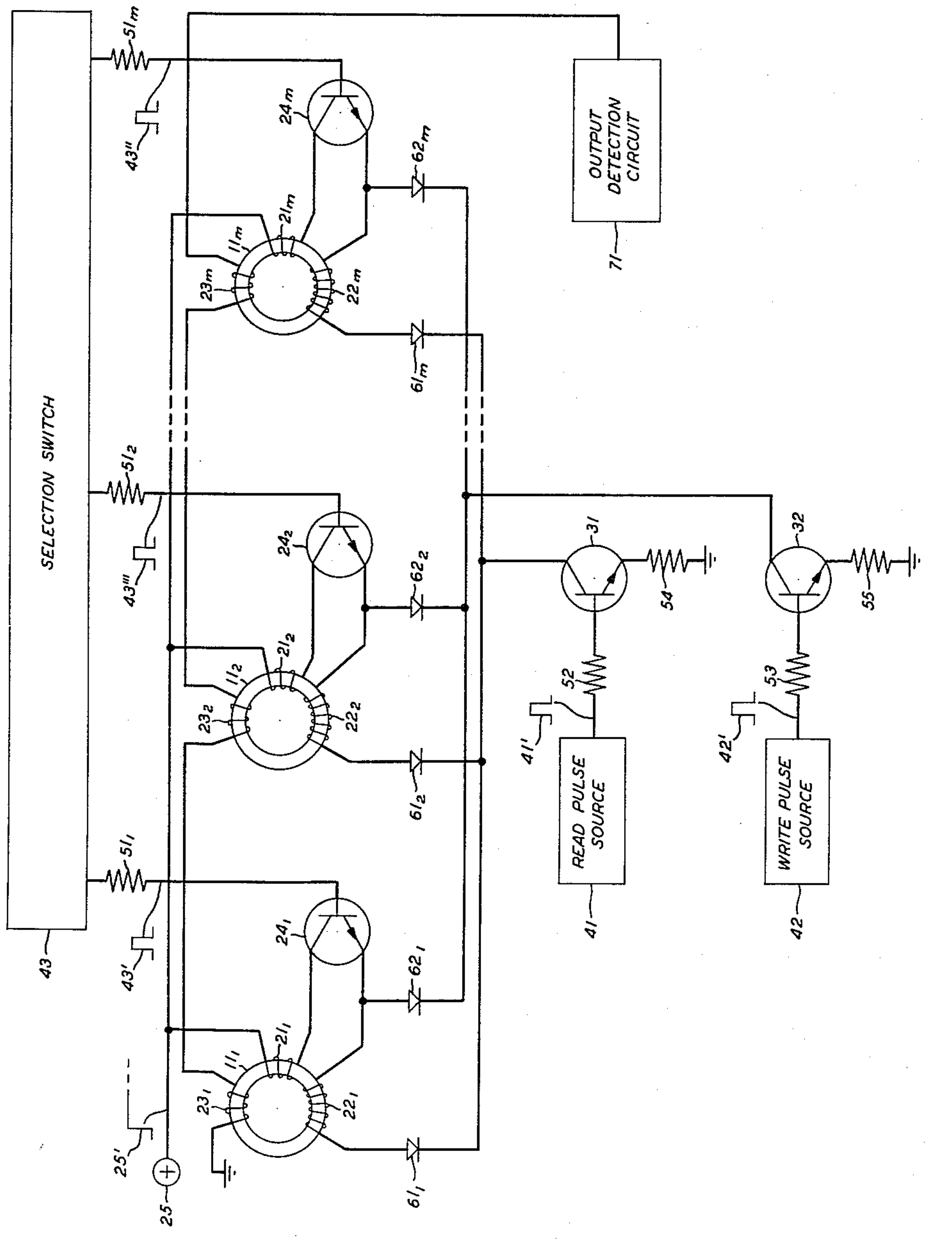
INVENTORS I. DORROS
A. FEINER
BY
William H. Kamstra
ATTORNEY 3,118,134

MAGNETIC MEMORY CIRCUITS

Irwin Dorros, Livingston, and Alexander Feiner, Boonton, N.J., assignors to Bell Telepone Laboratories, Incorporated, New York, N.Y., a corporation of New York Filed July 14, 1960, Ser. No. 42,861
12 Claims. (Cl. 340—174)

This invention relates to magnetic memory circuits and more particularly to such circuits employing toroidal magnetic cores.

Memory circuits utilizing magnetic cores disposed in rows and columns to form a matrix arrangement are well known and have found wide application. Coincident current techniques can advantageously be utilized with such circuits for the selection of particular cores for the storage of binary information. In a memory circuit containing $n^2$ memory cores in an $n \times n$ array, coincident current access circuitry is required which can provide $2n$ selection signals, i.e. one on each of $n$ row conductors and $n$ column conductors. Thus an array which can store $n^2$ bits of binary information requires means for applying $2n$ selection signals if coincident current techniques are utilized. Thus, for each selection signal provided, $n/2$ bits of binary information may be stored in the $n \times n$ array. If, on the other hand, direct access techniques are utilized, a separate selection signal must be available for each magnetic core of the memory. Thus a saving in access circuitry is made possible by the use of coincident current techniques, which saving, however, is of relatively greater importance as the size of the memory increases. In memory circuits of low capacity, on the other hand, where the economics of the access circuitry permit, advantages may be realized by using direct access to the individual information storage cores. Thus, in large memory arrays, coincident current operation necessitates that all of the cores used have substantially uniform hysteresis characteristics. Furthermore, in coincident current operation the permissible magnitude of the selection signals employed is limited, thereby necessitating a slower switching time than is realizable by the use of selection signals of a large magnitude. Low capacity storage arrays employing direct access techniques may thus frequently be utilized to advantage in many information handling circuits.

Thus it is an object of this invention to provide new and improved access circuitry for magnetic core memory circuits of low storage capacity.

It is a further object of this invention to achieve access to a magnetic core memory circuit by means of direct access techniques rather than by means of coincident current techniques.

It is a still further object of this invention to provide new and improved access circuitry which realizes a saving in circuit components over that previously utilized with direct access magnetic memory circuits.

The above and other objects are realized in one embodiment according to the principles of this invention comprising a magnetic core memory circuit utilizing direct access techniques in which a single transistor associated with each core is used for both read and write access. Each core has a write and a read winding inductively coupled thereto in a series circuit which circuit also includes the collector and emitter of an access transistor. The write winding, which in one embodiment has $n$ turns, is connected to a source of potential and the read winding, which in the same embodiment has $2n$ turns, is connected to read control circuitry. The latter winding is by-passed by a connection to write control circuitry. Two energizing paths are thus available from the source of potential, one of which may be traced through the write winding and the transistor to the write control circuitry and the other of which may be traced through the write winding, the transistor, and the read winding to the read control circuitry. Information is written into a particular core by simultaneously energizing the access transistor associated therewith and the write control circuitry to cause a current to pass through the write winding and the access transistor to the write circuiry, by-passing the read winding and thereby driving the core to a first condition of remanent magnetization. Information is read out of a particular core by simultaneously energizing the access transistor associated therewith and the read control circuitry to cause a current to pass through the write winding, the access transistor, and the read winding to the read control circuitry, thereby driving the core to the opposite condition of remanent magnetization. The write and read windings are coupled to the core in a sense such that the read current circuit produces magnetomotive drives of opposite directions in the two windings with the result that the read current produces a net magnetomotive drive on the core which is opposite in direction to the magnetomotive drive on the core produced by the write current. An output winding also inductively coupled to the core detects any switching of the core caused by the read current. Core selection during either the read or write operation is accomplished by the application of a signal to the base of the access transistor associated with the selected core. Thus, advantageously only one access transistor is utilized rather than separate transistors for the read and write operations.

Thus, according to one feature of this invention, the cores of a magnetic core memory circuit have inductively coupled thereto a read winding and a write winding with both of these windings being connected to a single access transistor.

According to another feature of this invention, a read winding is inductively coupled to each magnetic core of a memory circuit by a number of turns substantially greater than that of a write winding also coupled to each core.

According to still another feature of this invention, a magnetic core memory circuit utilizing direct access techniques has but a single access transistor associated with each core.

The foregoing and other objects and features of this invention will be more clearly understood from a consideration of the detailed description of one illustrative embodiment thereof which follows when taken in conjunction with the accompanying drawing, the single figure of which depicts a specific magnetic core memory circuit according to the principles of this invention.

The drawing depicts magnetic cores $11_1$ through $11_m$ each of which advantageously has a substantially rectangular hysteresis characteristic. The cores can therefore manifest either of two conditions of remanent magnetization, one of which will be considered a set condition and the other a reset condition. Write winding $21_1$ through $21_m$ are inductively coupled to the cores $11_1$ through $11_m$, respectively, by $n$ turns each and read windings $22_1$ through $22_m$ are inductively coupled to the cores $11_1$ through $11_m$, respectively, by $2n$ turns each. Additionally, output windings $23_1$ through $23_m$ are inductively coupled to the cores $11_1$ through $11_m$, respectively. Access transistors $24_1$ through $24_m$ are associated with the cores $11_1$ through $11_m$, respectively, and each of the transistors 24 has its collector connected to the write winding 21 and its emitter connected to the read winding 22 of its associated core. All of the write windings 21 are connected at their other ends to a source of positive potential 25 and all of the read windings 22 are connected at their other ends to common read circuitry comprising gating transistor 31 and a source of read control pulses 41. Furthermore, all of the access transistors 24 also have their emitters connected to common write circuitry comprising gating transistor 32 and a source of write control signals 42. Resistance elements $51_1$ through $51_m$ are connected between a common selection switch 43 and the bases of the access transistors $24_1$ through $24_m$, respectively. Resistance elements 52 and 53 are connected between source 41 and the base of transistor 31 and between source 42 and the base of transistor 32, respectively. Resistance elements 54 and 55 are both connected between ground and the emitter of transistor 31 and the emitter of transistor 32, respectively. The read circuitry also includes diodes $61_1$ through $61_m$, poled as described hereinafter, connected between the collector of transistor 31 and the read winding $22_1$ through $22_m$, respectively. The write circuitry also includes diodes $62_1$ through $62_m$, poled as described hereinafter, connected between ground and an output detection circuit 71. The output windings $23_1$ through $23_m$ are serially connected the access transistors $24_1$ through $24_m$, respectively. The between the collector of transistor 32 and the emitters of potential source 25 may comprise any circuit well known in the art capable of providing a voltage of a constant magnitude, and output detection circuit 71 may comprise any well-known circuit capable of detecting signals applied thereto. Similarly, pulse sources 41 and 42 comprise well-known circuits capable of providing pulses of the character described hereinafter. Consequently, these circuits are represented in the drawing in block diagram form. Selection switch 43 may comprise any well-known circuit capable of selectively applying positive pulses of the character described hereinafter to the access transistors 24. Switch 43 is utilized during both write and read phases of operation and may be of a character to permit information to be written into the cores either selectively or simultaneously. The switch 43 is also represented in the drawing in block diagram form.

Bearing in mind the foregoing organization of the depicted embodiment according to the principles of this invention, a detailed description of illustrative operations of the circuit will now be provided.

Information is written into a particular one of the cores by the simultaneous transmission of pulses from write pulse source 42 and selection switch 43. The selection switch applies signals to the bases of only those transistors $24_1$ through $24_m$ which are associated with cores which are to be driven to a set condition which condition may conventionally represent the storage of a binary "1." Thus, if it is desired to drive cores $11_1$ and $11_m$ to a set condition, signals 42′, 43′ and 43″ are simultaneously applied to the bases of transistors 32, $24_1$, and $24_m$, respectively, from the source 42 and switch 43. The signal 42′ applied to the base of transistor 32 renders this transistor effectively a short circuit. Similarly, the signals 43′ and 43″ applied to the base of transistor $24_1$ and to the base of transistor $24_m$ effectively render these transistors short circuits. Current flow thus develops from potential source 25 through write winding $21_1$, transistor $24_1$, diode $62_1$ and transistor 32 to ground and also from potential source 25 through write winding $21_m$, transistor $24_m$, diode $62_m$ and transistor 32 to ground. The diodes 62 accomplish an isolating function and are poled to permit the conduction of current as described. Transistor 31 is at this time effectively an open circuit, thus preventing current flow in the read winding $22_1$ and $22_m$. The write currents in windings $24_1$ and $21_m$ produce magnetomotive forces which drive the cores $11_1$ and $11_m$ to a set magnetic condition to thereby represent binary "1's." Those cores not driven to a set condition, such as the core $11_2$, remain in a reset magnetic condition which condition may conventionally represent the storage of a binary "0."

Information is read out of particular cores by the simultaneous transmission of pulses from read pulse source 41 and selection switch 43. Thus, if it is desired to read out information from the core $11_1$, which previously had been driven to a set magnetic condition, signals 41′ and 43′ are simultaneously applied to the bases of transistors 31 and $24_1$, respectively, from the source 41 and switch 43, respectively. The signal 41′ applied to the base of transistor 31 renders this transistor effectively a short circuit, and the signal 43′ applied to the base of transistor $24_1$ permits a current flow to take place through this transistor. Thus a current flow occurs from potential source 25 through write winding $21_1$, transistor $24_1$, read winding $22_1$, diode $61_1$ and transistor 31 to ground. Isolating diodes 61 are also poled to permit the conduction of current as described. Transistor 32 is at this time effectively an open circuit thus preventing current flow through diode $62_1$ and transistor 32. The magnetomotive force induced in the winding $21_1$ is of a directon to maintain core $11_1$ in a set magnetic condition; however, the magnetomotive force induced in the winding $22_1$ is of a direction to drive the core to a reset magnetic condition. Because the read winding $22_1$ is inductively coupled to core $11_1$ by $2n$ turns, while the write winding $21_1$ is inductively coupled to the core by $n$ turns, the magnetomotive force generated in winding $22_1$ is approximately twice the magnitude of the magnetomotive force generated in winding $21_1$. Therefore, the net magnetomotive drive applied to the core $11_1$ is in a direction to switch the core to a reset magnetic condition.

The switching of core $11_1$ from a set to a reset magnetic condition by the read current applied to windings $21_1$ and $22_1$ induces a signal in the output winding $23_1$. The output signal induced in winding $23_1$ is transmitted via the serially connected output windings 23 of the other cores to the output detection circuit 71.

Information is read out of the other cores in a manner similar to that described for core $11_1$. Thus, information is read out of core $11_m$ by the simultaneous application of signals 41′ and 43″ to the bases of transistors 31 and $24_m$, respectively, from the source 41 and switch 43, respectively. The core $23_m$ will similarly be switched to a reset condition by a current flow in the oppositely poled windings $21_m$ and $22_m$, and a signal will consequently be induced in output winding $23_m$ and transmitted to the output detection circuit 71.

Interrogation of unset cores, that is, cores containing binary "0's" such as the core $11_2$ by the simultaneous application of signals 41′ and 43‴ from source 41 and switch 43 to the bases of transistors 31 and $24_2$, respectively, will, on the other hand, not result in the switching of this core since the information stored in this core was manifested by the core's remaining in the reset magnetic condition during the write interval. Thus, no signal is induced in output winding $23_2$ and no output signal is detected by circuit 71. Thus, the detection by the circuit 71 of the absence of an output signal responsive to the interrogation of core $11_2$ is indicative of the binary "0" stored in this core.

What has been described is considered to be only one illustrative embodiment of the present invention. Thus, various other arrangements may be devised by one skilled in the art without departing from the spirit and scope of this invention.

What is claimed is:

1. A memory circuit comprising a plurality of magnetic cores each having substantially rectangular hysteresis characteristics, a write winding inductively coupled to each of said cores by $n$ turns, a read winding inductively coupled to each of said cores by substantially more than $n$ turns, a write circuit for each of said cores including a source of potential, said write winding, and a transistor gating means, a read circuit for each of said cores also including said source of potential, said write winding, and said transistor gating means, and further including said read winding; a write control means connected to each of said write circuits, a read control means connected to each of said read circuits, and output means including an output winding inductively coupled to each of said cores for detecting the switching of said cores.

2. A memory circuit according to claim 1 in which said read windings are coupled to said cores by $2n$ turns.

3. A magnetic memory circuit comprising a plurality of magnetic cores each having substantially rectangular hysteresis characteristics, a write winding and a read winding inductively coupled to each of said cores, each of said read windings being coupled to said cores by a number of turns substantially greater than the number of turns coupling said write windings to said cores, a write circuit for each of said cores including a source of potential, said write winding, and a transistor gating means, a read circuit for each of said cores also including said source of potential, said write winding, and said transistor gating means, and further including said read winding; means including means for energizing the transistor gating means associated with a selected one of said cores to effect a current flow through the write circuit associated with said core to drive said selected core to a first condition of remanent magnetization, means including said means for energizing said transistor gating means to effect a current flow through the read circuit associated with said selected core to drive said core to a second condition of remanent magnetization, and means for detecting flux reversals in said selected core.

4. A memory circuit comprising a write circuit including a write winding inductively coupled to a magnetic core having substantially rectangular hysteresis characteristics, a source of potential, and a transistor gating means, a read circuit also including said write winding, said source of potential, and said transistor gating means, and further including a read winding also inductively coupled to said magnetic core, said read winding being inductively coupled to said core by a number of turns substantially greater than the number of turns coupling said write winding to said core, a write control means connected to said write circuit, a read control means connected to said read circuit, said write winding being energizable responsive to the coincident energization of said gating means and said write control means for driving said core to a first condition of remanent magnetization, said read winding being energizable responsive to the coincident energization of said gating means and said read control means for driving said core to a second condition of remanent magnetization, and means for detecting flux reversals in said core.

5. A magnetic memory circuit comprising a plurality of magnetic cores, each having a substantially rectangular hysteresis characteristic, each of said cores having a write winding and a read winding inductively coupled thereto and a first gating means associated therewith, the write and read windings of each core being serially connected through the gating means associated with that core, said write windings being also connected to common control circuitry including a second gating means, said read windings being also connected to common read control circuitry including a third gating means, means for effecting a write current through the write winding coupled to a selected one of said cores, said first gating means associated with said selected core and said write control circuitry to drive said selected core to a set magnetic condition, means for effecting a read current through the write winding coupled to said selected core, said first gating means associated with said selected core, the read winding coupled to said selected core, and said read control circuitry to drive said selected core to a reset magnetic condition, and means for detecting flux reversals in said core.

6. A magnetic memory circuit according to claim 5 in which said read windings are coupled to said cores by a substantially greater number of turns than are said write windings.

7. A magnetic memory circuit according to claim 6 in which the number of turns coupling said read windings to said cores is approximately twice the number of turns coupling said write windings to said cores.

8. A magnetic memory circuit according to claim 7 in which said first, second and third gating means comprise transistors.

9. A memory circuit comprising a magnetic core having a substantially rectangular hysteresis characteristic and having a write and a read winding inductively coupled thereto, one of said windings having substantially more turns than the other of said windings, means for serially connecting said windings in opposing senses, means for by-passing the one of said windings having more turns, means including said by-pass means for effecting a current only in the one of said windings having fewer turns to produce a magnetomotive drive of a first direction to drive said core to a first condition of remanent magnetization, means for effecting current in both of said windings to produce a net magnetomotive drive of a second direction to drive said core to a second condition of remanent magnetization, and means for detecting flux reversals in said core.

10. A memory circuit comprising a magnetic core having a substantially rectangular hysteresis characteristic, a first circuit comprising a source of potential and a write winding inductively coupled to said core and serially connected to a first switching means, a second circuit comprising two parallel branches serially connected to said first circuit, one branch of said second circuit comprising a read winding inductively coupled to said core and serially connected to a second switching means, said read winding having substantially more turns than said write winding, the other branch of said second circuit comprising a third switching means, means for driving said core to a set magnetic condition including means for simultaneously closing said first switching means and said third switching means for effecting a current in said first circuit and said other branch of said second circuit, means for driving said core to a reset magnetic condition including means for simultaneously closing said first switching means and said second switching means for effecting a current in said first circuit and said one branch of said second circuit, and means for detecting flux reversals in said core.

11. A memory circuit comprising a plurality of magnetic cores each having substantially rectangular hysteresis characteristics, a first circuit associated with each of said cores, each of said first circuits comprising a source of potential, a write winding inductively coupled to its associated core, and a first switch, each of said first circuits being serially connected to a second circuit comprising two parallel branches, one branch of each of said second circuits comprising a read winding inductively coupled to its associated core and serially connected to a second switch, said read windings having substantially more turns than said write windings, said second switch being common to the said one branch of all of said second circuits, the other branch of each of said second circuits comprising a third switch common to all of said second circuits, means for controlling a selected one of said first switches, and means for selectively controlling said second and third switches simultaneously with the control of said selected one of said first switches.

12. A memory circuit comprising a magnetic core having a substantially rectangular hysteresis characteristic, a first circuit comprising a source of potential, a write winding inductively coupled to said core, a first switching means, and a second switching means, a second circuit comprising said source of potential, said write winding, said first switching means, a read winding inductively coupled to said core and having substantially more turns than said write winding, and a third switching means, means for driving said core to a set magnetic condition representative of a first binary value including means for simultaneously closing said first switching means and said second switching means for effecting a current in said first circuit, means for driving said core to a reset magnetic condition representative of a second binary value including means for simultaneously closing said first switching means and said third switching means for effecting a current in said second circuit, and means for detecting flux reversals in said core.

References Cited in the file of this patent

UNITED STATES PATENTS

| | | |
|---|---|---|
| 2,879,380 | Neitzert | July 28, 1959 |
| 2,903,601 | Schneider | Sept. 8, 1959 |
| 2,917,727 | Reach | Dec. 15, 1959 |
| 2,956,168 | Pinckaers | Oct. 11, 1960 |
| 2,968,796 | Lane et al. | Jan. 17, 1961 |
| 2,976,431 | Richards | Mar. 21, 1961 |